(No Model.)
L. S. SAFFORD.
GRAIN BOX.
No. 555,127. Patented Feb. 25, 1896.
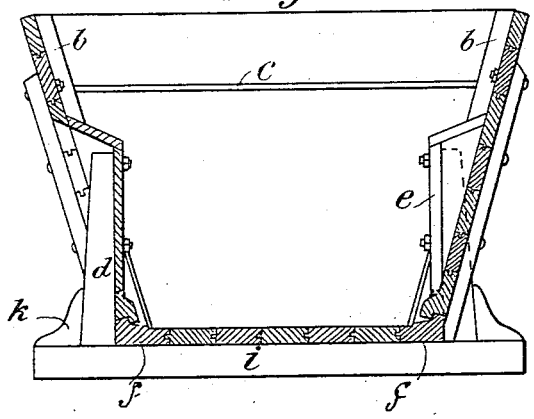
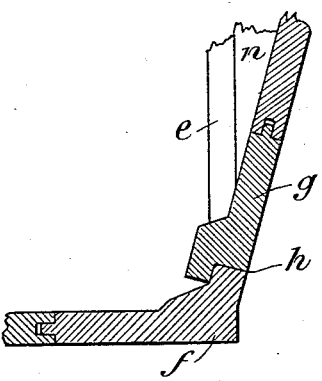
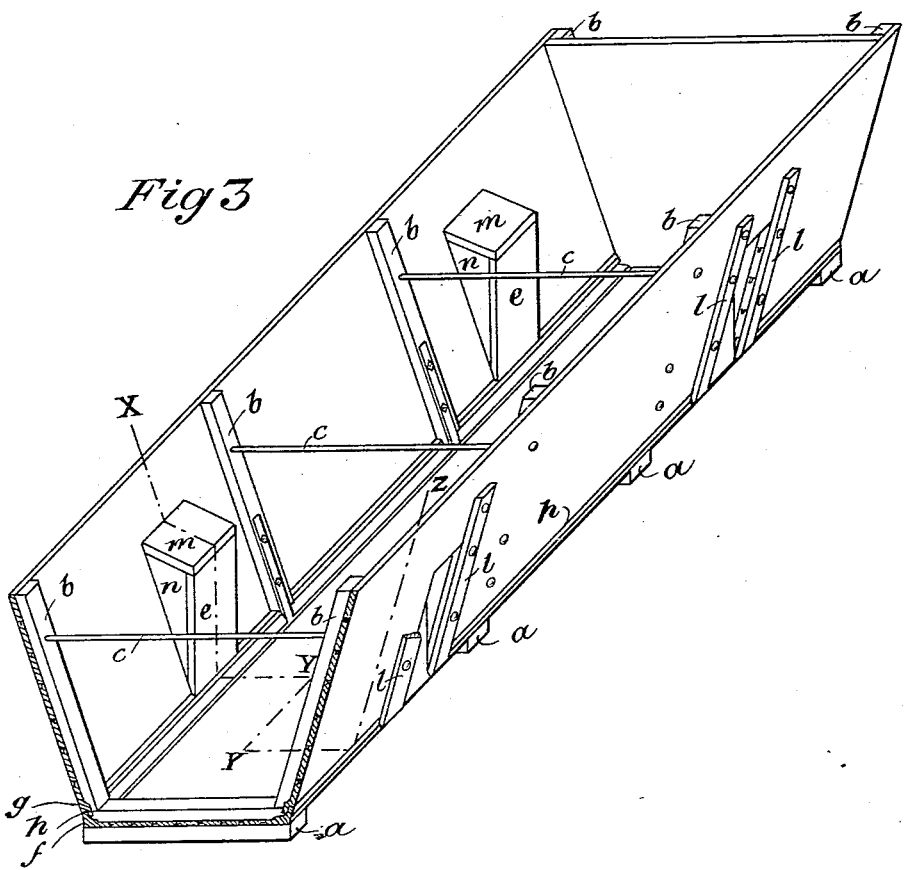
Witnesses
Ida McKenzie
W. E. Smith
Inventor
Larkin S Safford

UNITED STATES PATENT OFFICE.

LARKIN S. SAFFORD, OF KELSO, NORTH DAKOTA.

GRAIN-BOX.

SPECIFICATION forming part of Letters Patent No. 555,127, dated February 25, 1896.

Application filed September 26, 1894. Serial No. 524,185. (No model.)

*To all whom it may concern:*

Be it known that I, LARKIN S. SAFFORD, a citizen of the United States, residing at Kelso, in the county of Traill and State of North Dakota, have invented new and useful Improvements in Grain-Boxes, of which the following is a specification.

The annexed drawings, to which reference is made, illustrate my invention.

Figure 1 is an end sectional view on the line X Z. Fig. 2 is a sectional view on the line X Z of a corner of the box on an enlarged scale, showing the enlarged edges of the floor and sides and the lower part of the cover $e\ m\ n$. Fig. 3 is a view in perspective of the box, excepting the boarding at one end.

Similar letters refer to similar parts in the different views.

The bed-pieces $a$ and standards $b$ constitute the frame, the standards being usually fastened to the bed-pieces as they are in other boxes for hauling grain and similar materials on wagons and sleds.

For the purpose of having the boxes as wide and low as possible the sides are fastened at such an angle as to make the boxes much wider at the top than at the bottom, thus having the loads lower than the same amount would be in boxes with upright sides.

The bolster-stakes $d$ in common use being perpendicular will not join properly with the spreading sides, they being too near together, excepting at the lower part. Therefore openings $l$ are made in the sides to admit the bolster-stakes.

The openings $l$ are tightly closed by triangular covers $e\ m\ n$, of wood, iron, or other suitable material, which are very firmly bolted to the inner part of the sides, so as to be in contact with the inner sides of the bolster-stakes $d$, which stakes supplement the cross-rods $c$ in preventing the grain-boxes from being spread outwardly by the pressure of the loads. The greater width of these boxes by reducing the height of the loads causes them to be drawn more easily, with less strain on the boxes and wagons, and the sides, being straight from top to bottom instead of spreading outwardly above the bolster-stakes, are stronger and cheaper than the spreading boxes in common use, which commence to spread above the upper ends of the bolster-stakes.

The floors of grain-boxes being very liable to settle or spring down under the pressure of heavy loads, the outer edges of the floors are made thicker than the rest, as at $f$, or in any other suitable form, so as to make the floor stiff at that point, and also to permit the sides to lap down over the joint $h$ where the sides and bottom join, the joint $h$ being always above the lower part of the sides.

The floors may be of any suitable form and thickness at the edges, as at $f$, to make them of sufficient strength and to permit the sides to lap down below the joint $h$ and be in contact with the inner part of the raised or thickened part of the floors.

The sides are usually thicker at the lower edges than above, and are rabbeted to properly join the floor, which, if the sides are made in this form, need not project outwardly beyond the side boarding and must not so project at the bolster-stakes and chafe-irons when chafe-irons are used to protect the woodwork from being worn by the wheels. The increased thickness of the sides at the lower part strengthens them where they are very liable to be broken by the forward wheels or otherwise.

I do not claim boxes for hauling grain and other similar materials made widest at the top, such boxes being in common use.

What I claim as new, and desire to secure by Letters Patent, is—

1. A box for hauling grain and similar material, having flaring sides, stake-openings in said sides and covers for said openings substantially as described.

2. A wagon-box having its bottom thickened at its sides with an upstanding edge, and sides having thickened or enlarged lower edges and provided with overhanging lips to fit over the upstanding edges of the bottom, substantially as described.

LARKIN S. SAFFORD.

In presence of—
JOHN CARMODY,
A. O. ANDERSON.